(12) United States Patent
Aoki

(10) Patent No.: US 10,604,091 B2
(45) Date of Patent: *Mar. 31, 2020

(54) VEHICLE POWER SUPPLY CONTROL DEVICE

(71) Applicant: Yazaki Corporation, Tokyo (JP)

(72) Inventor: Yoshihito Aoki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 15/889,446

(22) Filed: Feb. 6, 2018

(65) Prior Publication Data

US 2018/0222412 A1    Aug. 9, 2018

(30) Foreign Application Priority Data

Feb. 9, 2017    (JP) ................. 2017-022573

(51) Int. Cl.
  *B60R 16/033*    (2006.01)
(52) U.S. Cl.
  CPC ................. *B60R 16/033* (2013.01)
(58) Field of Classification Search
  CPC .......... B60R 16/033; B60L 58/12; B60L 3/12; B60L 1/10; B60L 1/00; Y02T 10/7005
  See application file for complete search history.

(56) References Cited

U.S. PATENT DOCUMENTS 9,545,889 B2    1/2017  Satake et al.
2006/0061213 A1*  3/2006  Michalko .................. H02J 4/00
                                                           307/9.1

FOREIGN PATENT DOCUMENTS

JP          2013-042563 A    2/2013

* cited by examiner

*Primary Examiner* — Jared Fureman
*Assistant Examiner* — Aqeel H Bukhari
(74) *Attorney, Agent, or Firm* — Sughrue Mion, PLLC

(57) ABSTRACT

A vehicle power supply control device includes a main line unit of one system, branch line units, a vehicle power supply master, and an area power supply master. The main line unit of the one system is provided to a vehicle. Each of the branch line units branches from the main line unit of the one system. The vehicle power supply master includes a main battery that charges and discharges electric power. The area power supply master is connected to the main line unit of the one system through the branch line unit and is connected to a load unit that consumes electric power, and includes an area battery that charges and discharges electric power. The vehicle power supply master supplies electric power of the main battery to the area power supply master through the main line unit of the one system.

16 Claims, 9 Drawing Sheets

VEHICLE POWER SUPPLY CONTROL DEVICE

CROSS-REFERENCE TO RELATED APPLICATION(S)

The present application claims priority to and incorporates by reference the entire contents of Japanese Patent Application No. 2017-022573 filed in Japan on Feb. 9, 2017.

BACKGROUND OF THE INVENTION

1. Field of the Invention

The present invention relates to a vehicle power supply control device.

2. Description of the Related Art

A conventional vehicle power supply control device supplies electric power to a load unit mounted on a vehicle. For example, the vehicle power supply control device includes a battery and a power supply box that is connected to the battery and to a plurality of load units (for example, Japanese Patent Application Laid-open No. 2013-42563). The vehicle power supply control device supplies electric power supplied from a battery to each load unit through the power supply box.

A vehicle may be provided with a main line unit that extends in a vehicle traveling direction and has a predetermined current capacity. In this case, the vehicle power supply control device may supply electric power of a battery to each load unit through a power supply box connected to a branch line that branches from the main line unit, and in this regard, the conventional vehicle power supply control device has room for further improvement.

SUMMARY OF THE INVENTION

In view of the foregoing, an object of the present invention is to provide a vehicle power supply control device capable of stably supplying electric power to a load unit of a vehicle.

In order to achieve the above mentioned above, a vehicle power supply control device according to one aspect of the present invention includes a main line unit of one system that is provided on a vehicle, a branch line unit that is branched off from the main line unit of the one system, a master power supply controller that is connected to the main line unit of the one system and includes a main power storage device that charges and discharges electric power, and an area power supply controller that is connected to the main line unit of the one system through the branch line unit and is connected to a load unit that consumes electric power, and includes a sub power storage device that charges and discharges electric power, wherein the master power supply controller supplies electric power of the main power storage device to the area power supply controller through the main line unit of the one system and the branch line unit, and the area power supply controller supplies, to the load unit, electric power that is supplied from the master power supply controller or electric power that is charged in the sub power storage device.

According to another aspect of the present invention, in the vehicle power supply control device, the area power supply controller may supply electric power of the sub power storage device to the load unit when the master power supply controller does not supply electric power to the area power supply controller through the main line unit of the one system and the branch line unit.

According to still another aspect of the present invention, in the vehicle power supply control device, the area power supply controller may supply electric power of the sub power storage device to the load unit when a charge rate of the sub power storage device is equal to or larger than a predetermined setting value, and the area power supply controller may do not supply electric power of the sub power storage device to the load unit when a charge rate of the sub power storage device is smaller than the setting value.

According to still another aspect of the present invention, in the vehicle power supply control device, the area power supply controller may preferentially supply electric power of the sub power storage device to the load unit when the master power supply controller is able to supply electric power to the area power supply controller through the main line unit of the one system and the branch line unit and a charge rate of the sub power storage device is equal to or larger than the setting value.

According to still another aspect of the present invention, in the vehicle power supply control device, a plurality of the area power supply controllers may be provided, and the master power supply controller may supply, depending on a situation, electric power of the sub power storage device of one of the area power supply controllers to the load unit connected to another of the area power supply controllers through the main line unit of the one system and the branch line unit.

According to still another aspect of the present invention, the vehicle power supply control device further may include an external electric power supply unit that is provided outside the area power supply controller and is different from the main power storage device, wherein the external electric power supply unit may be connected to the area power supply controller and may supply electric power to the area power supply controller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will now be described in detail with reference to the accompanying drawings. It should be noted that the embodiments described below are not intended to limit the present invention. Components described below include components that can be easily assumed by the skilled person and substantially like components. Furthermore, configurations described below can be combined as appropriate. Various kinds of omissions, substitutions, or changes of the configurations may be made without departing from the spirit of the present invention.

First Embodiment

Figure 1:
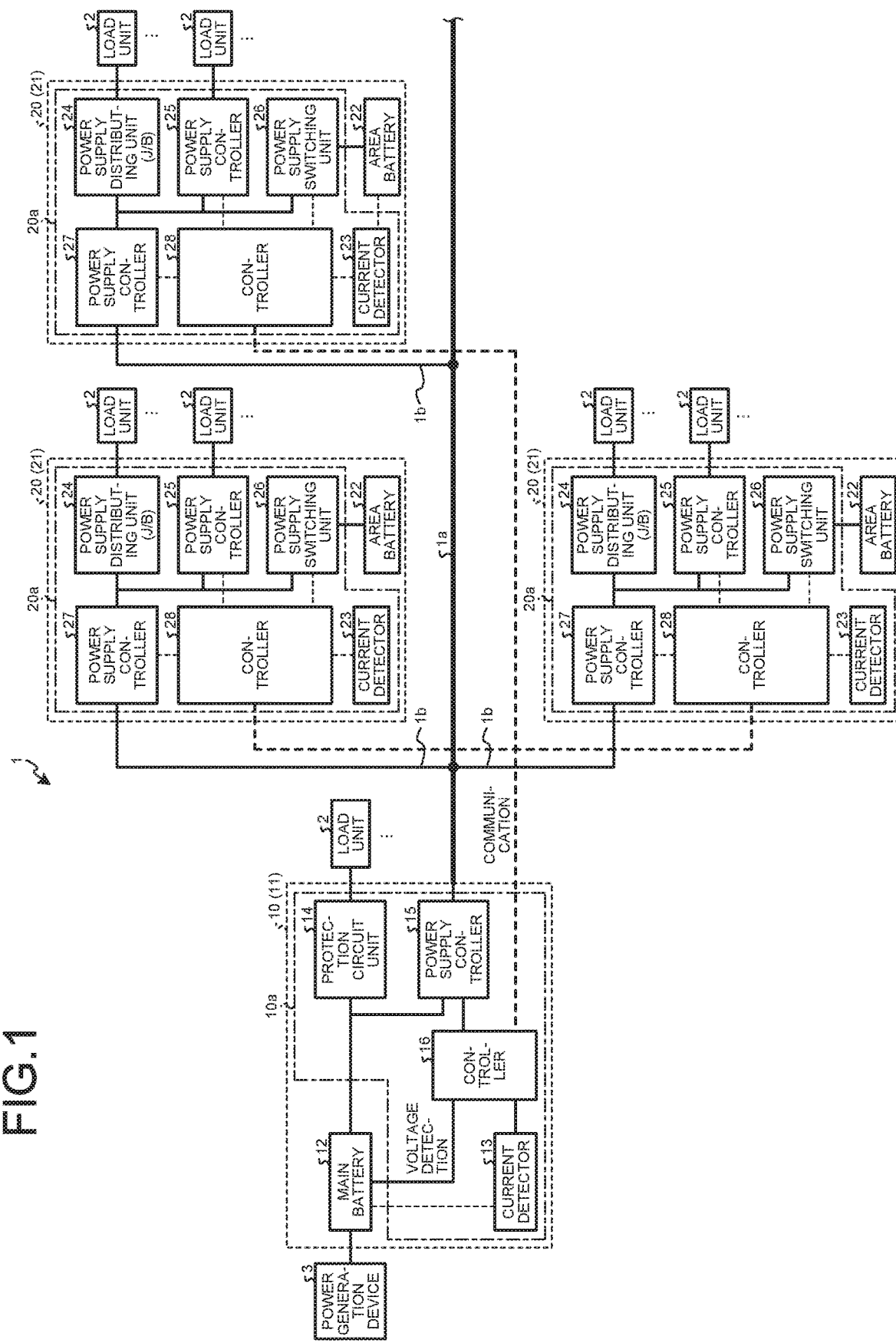
FIG. 1 is a block diagram illustrating a configuration example of a vehicle power supply control device in accordance with a first embodiment.
Figure 2:
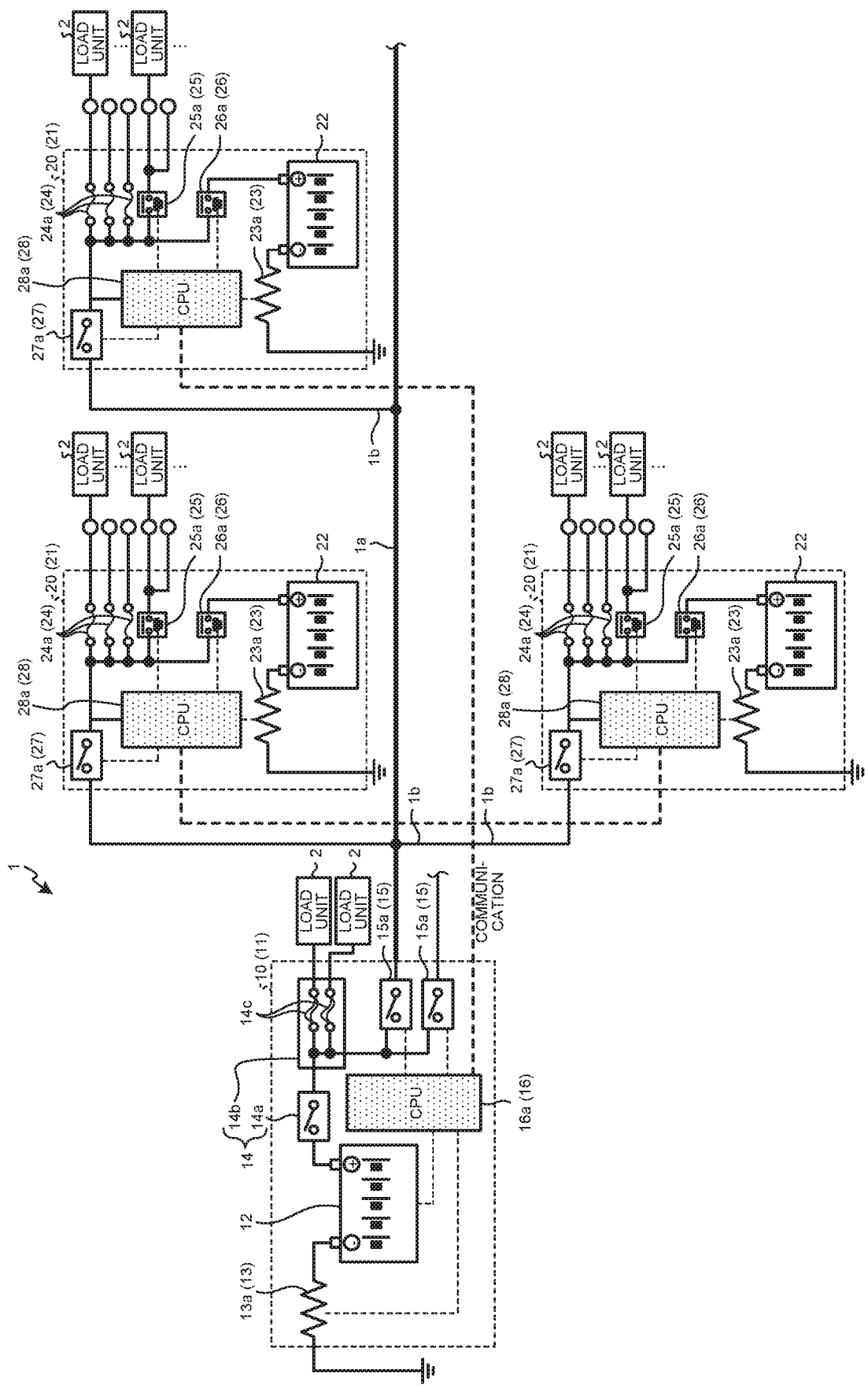
FIG. 2 is a circuit diagram illustrating a configuration example of the vehicle power supply control device in accordance with the first embodiment.

The following describes a vehicle power supply control device 1 according to a first embodiment. The vehicle power supply control device 1 is installed in a vehicle, which is not illustrated, and supplies electric power to a plurality of load units 2 mounted on the vehicle as illustrated in FIGS. 1 and 2. Hereinafter, the vehicle power supply control device 1 is described in detail.

The vehicle power supply control device 1 includes a main line unit 1a of one system, a plurality of branch line units 1b, a vehicle power supply master 10 which is also referred to as a master power supply controller, and a plurality of area power supply masters 20 which are also referred to as area power supply controllers. In the vehicle power supply control device 1, the main line unit 1a of the one system extends in a vehicle traveling direction, and the branch line units 1b branch from the main line unit 1a of the one system. The main line unit 1a of the one system may be formed in a T shape by extending in a direction that extends in a vehicle traveling direction and extending in a direction perpendicular to the vehicle traveling direction. The main line unit 1a of the one system is what is called a backbone main line unit, and the vehicle power supply master 10 is connected to one side of the main line unit 1a of the one system. Each of the area power supply masters 20 is connected to the main line unit 1a of the one system through the corresponding branch line unit 1b.

The main line unit 1a of the one system includes a main line unit power supply line, a main line unit communication line, and the like, which are not illustrated. The main line unit 1a of one system may include, only the main line unit power supply line of the main line unit power supply line, the main line unit communication line, and the like, and does not necessarily include the main line unit communication line and the like. In the main line unit 1a of the one system, the main line unit power supply line, the main line unit communication line, and the like are wired in parallel to a vehicle traveling direction. The main line unit power supply line has a predetermined current capacity, and is formed of a wiring material including a round bar conductor and a stranded conductor, a band-shaped flat conductor having a flat cross-sectional shape, and the like. The main line unit power supply line causes current supplied from the vehicle power supply master 10 and the area power supply masters 20 to flow. The main line unit communication line has a predetermined communication capacity, and is formed of a cable for electric signal transmission or a cable for light signal transmission and the like. The main line unit communication line transmits a signal transmitted from the vehicle power supply master 10 and the area power supply masters 20.

Each of the branch line units 1b includes a branch line unit power supply line, a branch line unit communication line, and the like, which are not illustrated. The branch line unit 1b may include, only the branch line unit power supply line of the branch line unit power supply line, the branch line unit communication line, and the like, and does not necessarily include the branch line unit communication line and the like. In the branch line unit 1b, one end is connected to the main line unit 1a of the one system, and the other end is connected to the corresponding area power supply master 20. The branch line unit power supply line has a less current capacity than that of the main line unit power supply line, and is formed of a wiring material including a round bar conductor and a stranded conductor, a band-shaped flat conductor having a flat cross-sectional shape, and the like. The branch line unit power supply line causes current supplied from the corresponding area power supply master 20 to flow. The branch line unit communication line has a less communication capacity than that of the main line unit communication line, and is configured by a cable for electric signal transmission or a cable for light signal transmission and the like. The branch line unit communication line transmits a signal transmitted from the corresponding area power supply master 20.

The vehicle power supply master 10 is a master power supply controller, and supplies electric power of a main battery 12 which is also referred to as a main power storage device, which will be described later, to the load units 2. For example, the vehicle power supply master 10 supplies electric power of the main battery 12 to the load units 2 through the area power supply masters 20, or supplies electric power of the main battery 12 to the load units 2 without passing through the area power supply masters 20. The vehicle power supply master 10 includes an electric power controller 10a, a case 11, and the main battery 12. The electric power controller 10a controls electric power of the main battery 12, and includes a current detector 13, a protection circuit unit 14, a power supply controller 15, and a controller 16. In the vehicle power supply master 10, for example, the electric power controller 10a and the main battery 12 are accommodated in the case 11. The vehicle power supply master 10 is, while various kinds of electronic components of the electric power controller 10a are accommodated in the case 11, installed in, for example, an engine compartment of a vehicle. Thus, the vehicle power supply control device 1 can easily install the vehicle power supply master 10. In the vehicle power supply master 10, the main battery 12 may be installed outside the case 11.

The main battery 12 is a main power storage device, and charges and discharges electric power. The main battery 12 includes various kinds of storage batteries such as a lead battery and a nickel-hydrogen battery, and a lithium-ion battery. The main battery 12 has a larger capacity than that of an area battery 22, which is also referred to as a sub power storage device, and will be described later. The main battery 12 may have the same capacity as that of the area battery 22 and may have a smaller capacity than that of the area battery 22. The main battery 12 is connected to a power generation device 3, for example, an alternator, and is charged with electric power generated by the power generation device 3.

The current detector 13 is connected to the main battery 12, and detects current of the main battery 12. For example, the current detector 13 includes a shunt resistor 13a, and detects current of charging/discharging of the main battery 12. Specifically, the current detector 13 detects current from a voltage that is proportional to current generated by resistance of the shunt resistor 13a.

The protection circuit unit 14 is a circuit that protects the load units 2. The protection circuit unit 14 is installed between the main battery 12 and the load units 2 connected to the vehicle power supply master 10, and protects a circuit from the main battery 12 to the load units 2. The protection circuit unit 14 includes an interruption circuit 14a and a protection circuit 14b. The interruption circuit 14a includes a switch and is connected to the main battery 12. The interruption circuit 14a turns on and off the switch so as to on/off-control current flowing from the main battery 12 into the load units 2. For example, when overcurrent flows from the main battery 12 into the load units 2, the interruption circuit 14a turns the switch off so as to interrupt the current. The protection circuit 14b includes a plurality of fuses 14c, and the fuses 14c are connected to the interruption circuit 14a. When overcurrent flows from the main battery 12 into the load units 2, the fuses 14c melt down and the protection circuit 14b protects a circuit.

The power supply controller 15 controls current flowing from the main battery 12 into the area power supply masters 20 through the main line unit 1a of the one system and the branch line units 1b. The power supply controller 15 includes an interruption circuit 15a. The interruption circuit 15a includes a plurality of switches, and is connected to the area power supply masters 20 through the switches and the main line unit 1a of the one system. The interruption circuit 15a turns on and off the switches so as to distribute electric power that is supplied from the main battery 12 to the area power supply masters 20 through the main line unit 1a of the one system and the branch line units 1b.

The controller 16 monitors a state of the main battery 12, and controls the power supply controller 15. The controller 16 includes a central processing unit (CPU) 16a. The CPU 16a is connected to the shunt resistor 13a, and determines a charge rate (charge amount) of the main battery 12 based on a current value of the main battery 12 detected by the shunt resistor 13a and a voltage value of the main battery 12. The CPU 16a is connected to the interruption circuit 15a of the power supply controller 15, and controls the interruption circuit 15a. For example, the CPU 16a on/off-controls the switches of the interruption circuit 15a based on a charge rate of the main battery 12. In this manner, the CPU 16a can control electric power that is distributed from the main battery 12 to the area power supply masters 20 based on a charge rate of the main battery 12. In addition, the CPU 16a is connected to the area power supply masters 20 through the main line unit 1a of the one system and the branch line units 1b, and exchanges signals with the area power supply masters 20.

The following describes a configuration example of the area power supply masters 20. Each of the area power supply masters 20 corresponds to an area power supply controller, and supplies, to the load units 2, at least one of the electric power that is supplied from the vehicle power supply master 10 and the electric power with which the area battery 22, which will be described later, is charged. The area power supply master 20 includes an electric power controller 20a, a case 21, and the area battery 22. The electric power controller 20a controls electric power that is supplied from the vehicle power supply master 10 and electric power with which the area battery 22 is charged. The electric power controller 20a includes a current detector 23, a power supply distributing unit (Junction block (J/B)) 24, a power supply controller 25, a power supply switching unit 26, a power supply controller 27, and a controller 28. In the area power supply master 20, for example, the electric power controller 20a and the area battery 22 are accommodated in the case 21. The area power supply master 20 is, while various kinds of electronic components of the electric power controller 20a are accommodated in the case 21, installed inside, for example, a front door and a rear door of a vehicle. Thus, the vehicle power supply control device 1 can easily install the area power supply masters 20. Because each of the area batteries 22 is accommodated in the case 21, the vehicle power supply control device 1 can reduce a line volume that connects the area battery 22 and can easily wire the line. In the area power supply master 20, the area battery 22 may be installed outside the case 21. In the first embodiment, the plurality of the area power supply masters 20 are installed, specifically, three area power supply masters 20 out of the area power supply masters 20 are installed. Each of the area power supply masters 20 is installed in a vehicle area partitioned depending on an assembling configuration of a vehicle, but this is not limiting.

The area battery 22 is a sub power storage device, and charges and discharges electric power. The area battery 22 includes various kinds of storage batteries such as a lead battery and a nickel-hydrogen battery, and a lithium-ion battery. The area battery 22 is prepared for each area power supply master 20.

The current detector 23 is connected to the area battery 22, and detects current of the area battery 22. The current detector 23 includes, for example, a shunt resistor 23a, and detects current of charging/discharging of the area battery 22. Specifically, the current detector 23 detects current from a voltage that is proportional to current generated by resistance of the shunt resistor 23a.

The power supply distributing unit 24 distributes electric power supplied from the main battery 12 and the area battery 22 to the load units 2. For example, the power supply distributing unit 24 includes a plurality of fuses 24a, and is connected to the load units 2 through the fuses 24a. When overcurrent flows into the load units 2, the fuses 24a melt down and the power supply distributing unit 24 protects a circuit.

The power supply controller 25 supplies electric power that is supplied from the main battery 12 and the area battery 22 to the load units 2. The power supply controller 25 includes, for example, a relay contact 25a, and has a plurality of load units 2 different from the load units 2 connected to the power supply distributing unit 24 connected thereto through the relay contact 25a. In other words, the area power supply master 20 has the load units 2 connected thereto through the power supply distributing unit 24 or the power supply controller 25. In the power supply controller 25, a coil of the relay contact 25a is excited and the relay contact 25a is turned on so as to supply electric power to the load units 2. In the power supply controller 25, excitation of the coil is released and the relay contact 25a is turned off so as to stop the electric power supplied to the load units 2.

The power supply switching unit 26 switches supply of electric power with which the area battery 22 is charged. The power supply switching unit 26 includes a relay contact 26a, and is connected to the power supply distributing unit 24 and the power supply controller 25 through the relay contact 26a. In the power supply switching unit 26, a coil of the relay contact 26a is excited and the relay contact 26a is turned on so as to supply electric power of the area battery 22 to the load units 2 through the power supply distributing unit 24 and the power supply controller 25. In the power supply switching unit 26, excitation of the coil is released and the relay contact 26a is turned off so as not to supply electric power of the area battery 22 to the load units 2 through the power supply distributing unit 24 and the power supply controller 25. When the power supply characteristics of the electric power (output voltage) supplied from the main battery 12 and the power supply characteristics of the electric power (output voltage) supplied from the area battery 22 are different, the power supply switching unit 26 makes the power supply characteristics equal to each other.

The power supply controllers 27 conduct or interrupt electric power that is supplied from the main battery 12. The power supply controller 27 is connected to the main battery 12 through the main line unit 1a of the one system and the branch line unit 1b and the like. The power supply controller 27 includes, for example, an interruption circuit 27a, and turns on and off a switch of the interruption circuit 27a so as to control electric power that is supplied from the main battery 12 to the load units 2 through the main line unit 1a of the one system and the branch line unit 1b and the like. The power supply controller 27 is connected to the controller 28, and the controller 28 on/off-controls the switch of the interruption circuit 27a.

The controller 28 monitors a state of the area battery 22, and controls the power supply controller 25, the power supply switching unit 26, and the power supply controller 27. The controller 28 includes a central processing unit (CPU) 28a. The CPU 28a is connected to the shunt resistor 23a, and determines a charge rate of the area battery 22 based on a current value of the area battery 22 detected by the shunt resistor 23a and a voltage value of the area battery 22.

The CPU 28a excites a coil of the relay contact 26a of the power supply switching unit 26 so as to turn on the relay contact 26a, and releases excitation of the coil of the relay contact 26a so as to turn off the relay contact 26a. For example, the CPU 28a on/off-controls the relay contact 26a based on a charge rate of the area battery 22. In this manner, the CPU 28a can control electric power that is supplied from the area battery 22 to the load units 2 based on a charge rate of the area battery 22. In addition, the CPU 28a on/off-controls the relay contact 25a of the power supply controller 25, and controls electric power that is supplied to the load units 2 connected through the power supply controller 25. The CPU 28a also on/off-controls the switch of the interruption circuit 27a of the power supply controller 27. Thus, the CPU 28a can conduct or interrupt electric power that is supplied from the main battery 12. The CPU 28a is connected to the vehicle power supply master 10 through the main line unit 1a of the one system and the branch line unit 1b, and exchanges signals with the vehicle power supply master 10.

First Operation Example: Charge Processing of Area Battery

Figure 3:
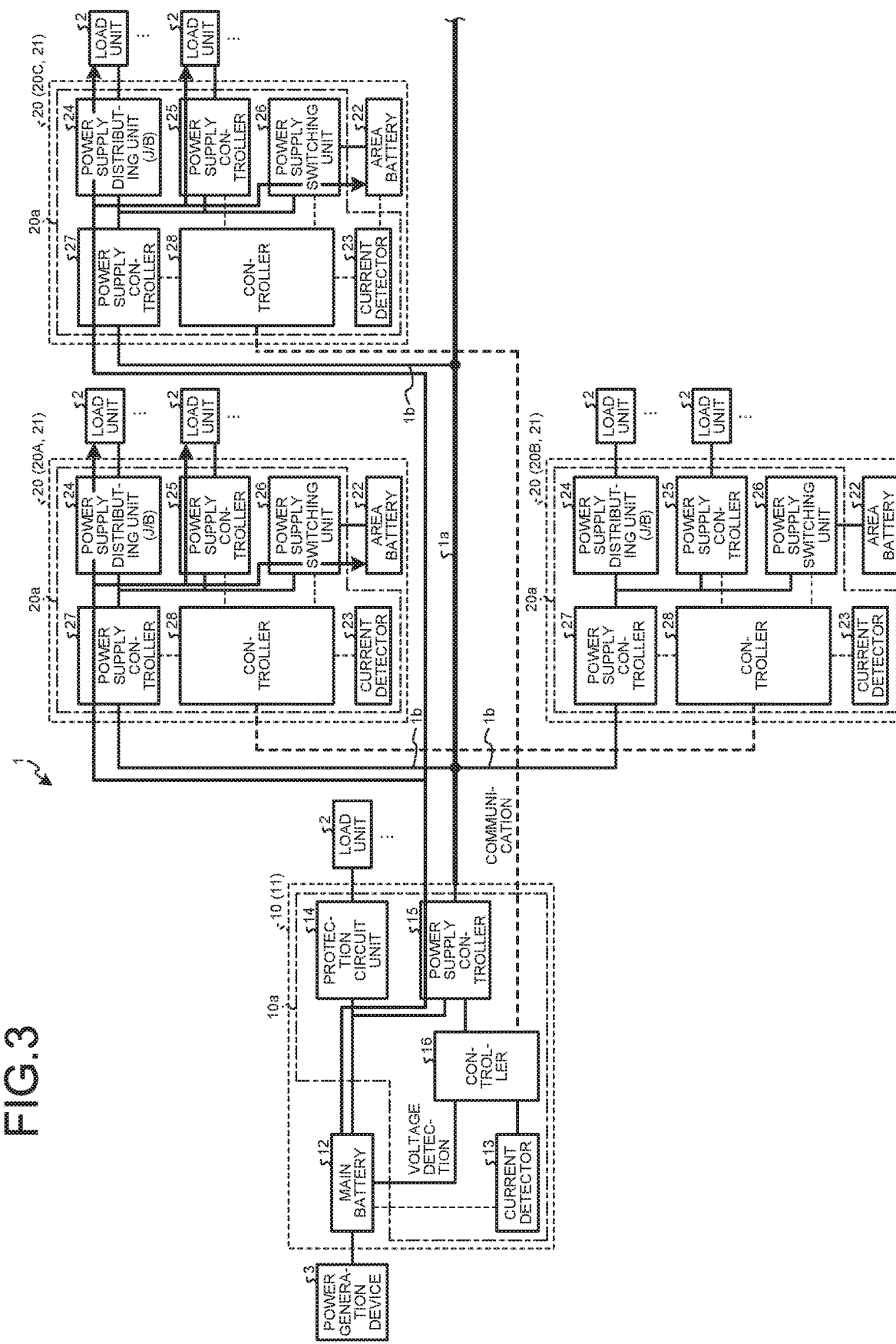
FIG. 3 is a block diagram illustrating a first operation example of the vehicle power supply control device in accordance with the first embodiment.
Figure 4:
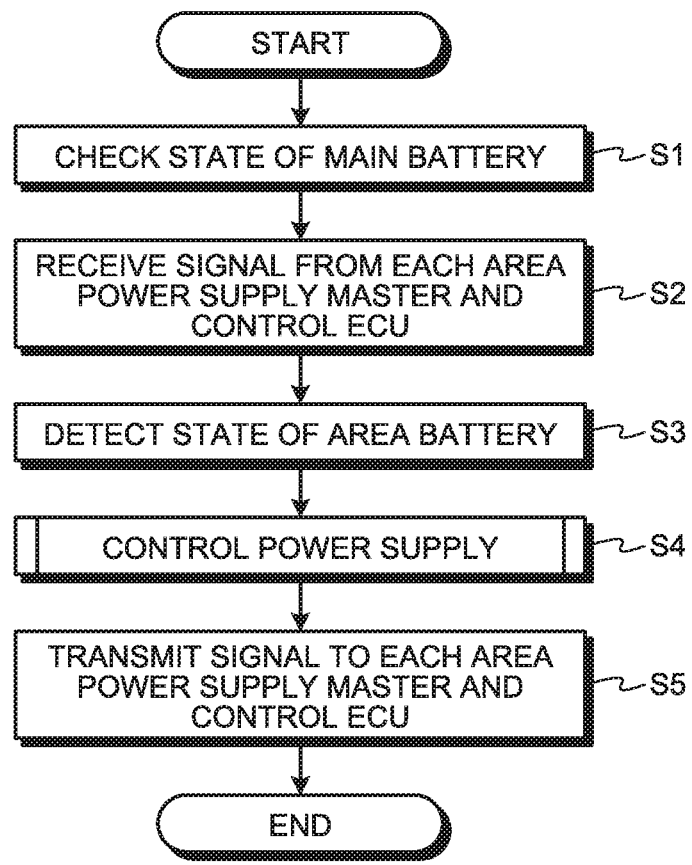
FIG. 4 is a flowchart illustrating a first operation example of the vehicle power supply control device in accordance with the first embodiment.

The following describes a first operation example of the vehicle power supply control device 1 according to the first embodiment. This example describes a case where the vehicle power supply control device 1 supplies electric power of the main battery 12 to the load units 2 of an area power supply masters 20A and 20C, and charges the area battery 22 of the area power supply masters 20A and 20C as illustrated in FIG. 3. The vehicle power supply master 10 checks a state of the main battery 12 as illustrated in FIG. 4 (Step S1). For example, the vehicle power supply master 10 checks a voltage value of the main battery 12. Subsequently, the vehicle power supply master 10 receives a signal related to electric power from each of the area power supply masters 20 and an electric controller (ECU), which is not illustrated, through the main line unit 1a of the one system and the branch line units 1b (Step S2). The ECU controls a whole vehicle, and controls, for example, a drive system such as an engine and a brake system such as a brake. Subsequently, the vehicle power supply master 10 detects a state of the area battery 22 from each of the area power supply masters 20 (Step S3). For example, the vehicle power supply master 10 detects a charge rate of the area battery 22 from each of the area power supply masters 20. Subsequently, the vehicle power supply master 10 controls the power supply (Step S4). For example, the vehicle power supply master 10 supplies electric power of the main battery 12 to each of the area power supply masters 20 and charges the area battery 22 based on a power generation capacity of the power generation device 3. The processing on power supply control will be described in detail later. Subsequently, the vehicle power supply master 10 transmits a signal to each of the area power supply masters 20 and the ECU through the main line unit 1a of the one system and the branch line units 1b (Step S5), and the process ends. For example, the vehicle power supply master 10 transmits information related to charging in Step S4 described above to each of the area power supply masters 20 and the ECU through the main line unit 1a of the one system and the branch line units 1b.

Figure 5:
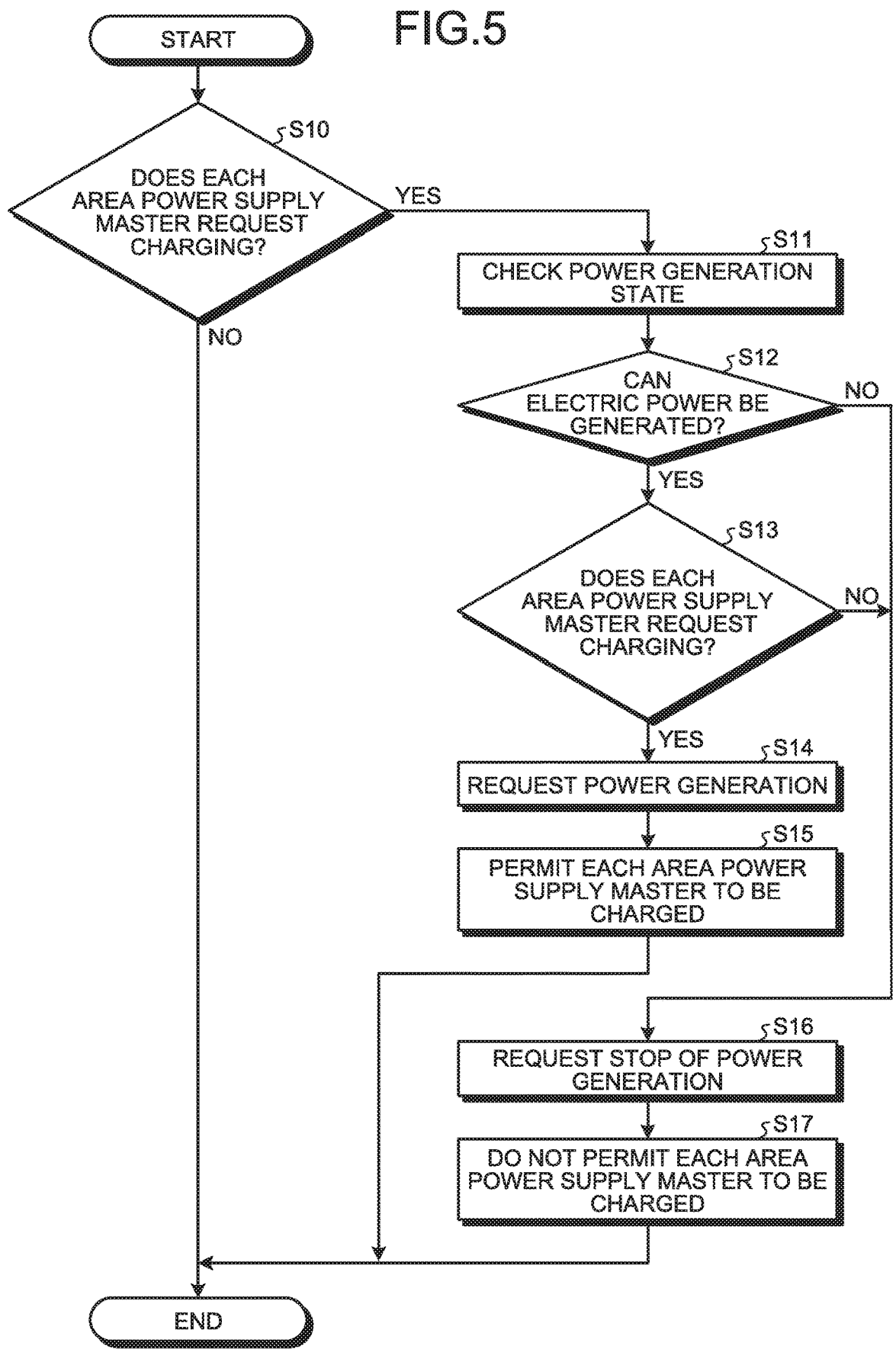
FIG. 5 is a flowchart illustrating the first operation example of the vehicle power supply control device in accordance with the first embodiment.

The following describes the processing on power supply control in Step S4 described above in detail. The vehicle power supply master 10 determines whether each of the area power supply masters 20 requests charging as illustrated in FIG. 5 (Step S10). When receiving a request of charging from each of the area power supply masters 20 (Yes in Step S10), the vehicle power supply master 10 checks a power generation state of the power generation device 3 (Step S11). Subsequently, the vehicle power supply master 10 determines whether the power generation device 3 can generate electric power for charging the area battery 22 (Step S12). When the power generation device 3 can generate electric power that charges the area battery 22 (Yes in Step S12), the vehicle power supply master 10 determines whether each of the area power supply masters 20 requests charging (Step S13). When receiving a request of charging from each of the area power supply masters 20 (Yes in Step S13), the vehicle power supply master 10 requests the power generation device 3 to generate electric power for charging the area power supply masters 20 (Step S14). Subsequently, the vehicle power supply master 10 permits each of the area power supply masters 20 to be charged, and supplies electric power that is generated by the power generation device 3 and with which the main battery 12 is charged to the area power supply masters 20 through the main line unit 1a of the one system and the branch line units 1b as illustrated in FIG. 3 (Step S15). The vehicle power supply master 10 charges the area battery 22 of each of the area power supply masters 20 and supplies electric power to each of the load units 2 through the corresponding area power supply master 20, and the process ends. At the time of charging the area battery 22 of each of the area power supply masters 20, the vehicle power supply master 10 may only charge the area battery 22 without supplying electric power to each of the load units 2 through the corresponding area power supply master 20.

When the power generation device 3 cannot generate electric power for charging the area battery 22 at Step S12 described above (No in Step S12), the vehicle power supply master 10 requests the power generation device 3 to stop generating electric power for charging each of the area power supply masters 20 (Step S16). Subsequently, the vehicle power supply master 10 does not permit each of the area power supply masters 20 to be charged (Step S17), and the process ends. When not receiving a request of charging from each of the area power supply masters 20 in Step S10 described above (No in Step S10), the vehicle power supply master 10 does not supply electric power generated by the power generation device 3 to the area power supply masters 20, and the process ends.

As described above, in the vehicle power supply control device 1 according to the first embodiment as the first configuration example, when receiving a request of charging from each of the area power supply masters 20, the vehicle power supply master 10 charges the corresponding area battery 22 of the area power supply masters 20 through the main line unit 1a of the one system and the branch line units 1b.

Figure 6:
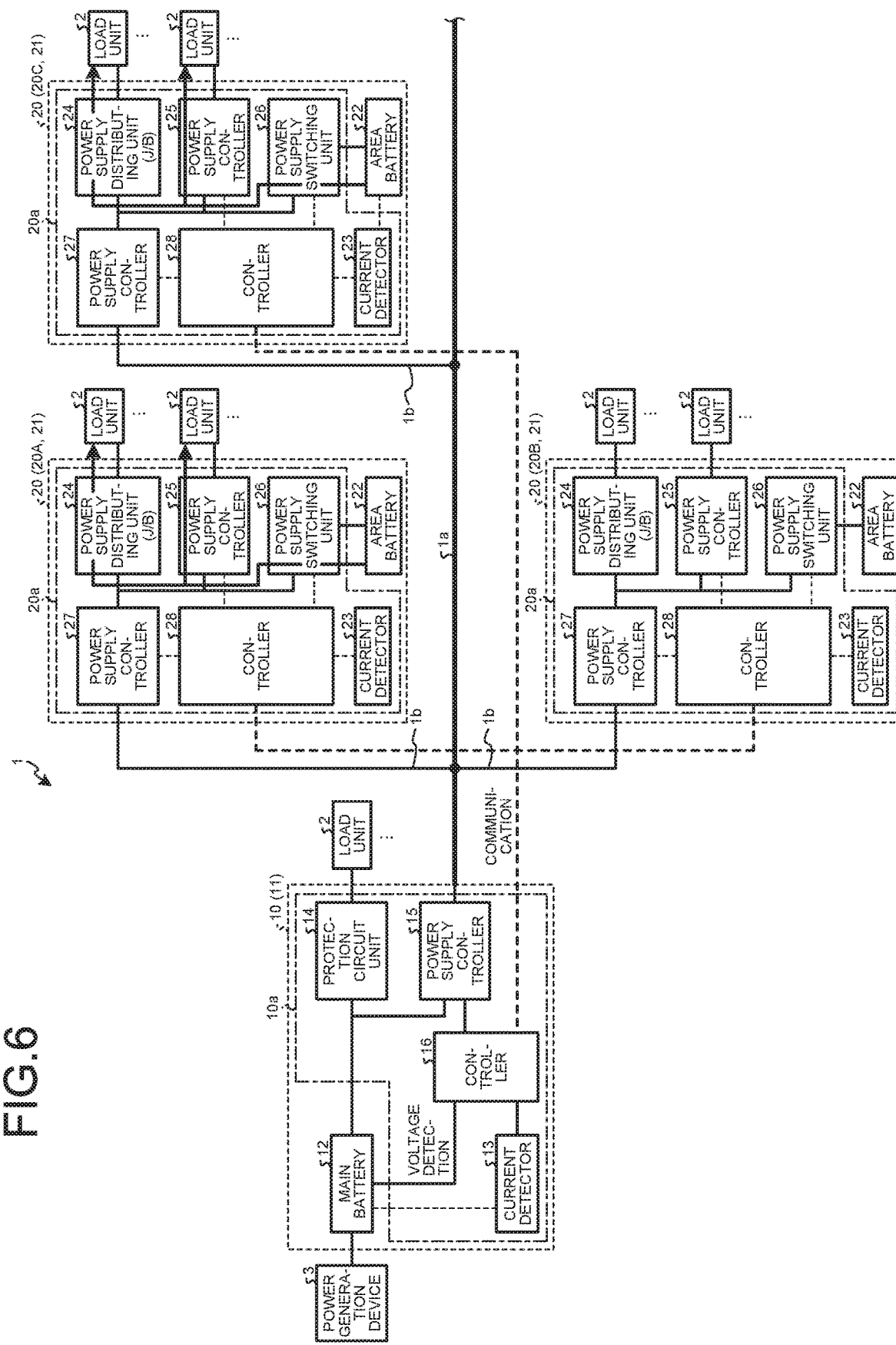
FIG. 6 is a block diagram illustrating a second operation example of the vehicle power supply control device in accordance with the first embodiment.
Figure 7:
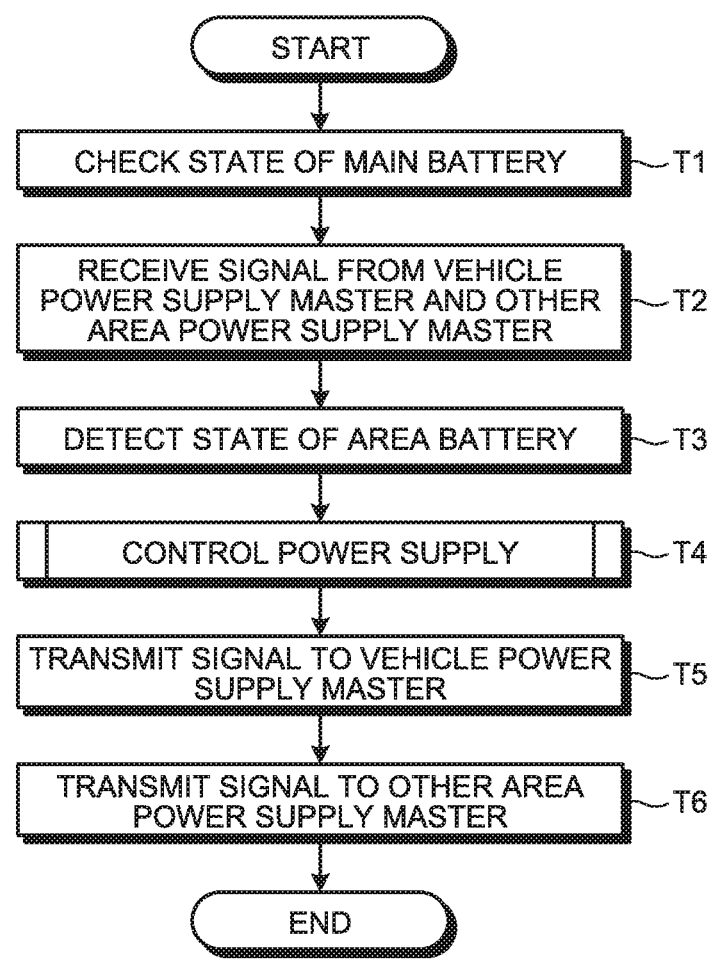
FIG. 7 is a flowchart illustrating the second operation example of the vehicle power supply control device in accordance with the first embodiment.

Second Operation Example: Processing when Electric Power Cannot be Supplied from Main Battery The following describes a second operation example of the vehicle power supply control device 1 according to the first embodiment. This example includes a case where the vehicle power supply control device 1 cannot supply electric power of the main battery 12 to the load units 2 of each of the area power supply masters 20 due to deterioration of the main battery 12, malfunction of the main line unit 1a of the one system or the branch line units 1b, abnormality of the power supply controller 27, and the like as illustrated in FIG. 6. Each of the area power supply masters 20 checks a state of the main battery 12 (for example, a voltage value) with the vehicle power supply master 10 as illustrated in FIG. 7 (Step T1). Subsequently, each of the area power supply masters 20 receives a signal related to electric power from the vehicle power supply master 10 and the other area power supply masters 20 through the main line unit 1a of the one system and the branch line units 1b (Step T2). Subsequently, each of the area power supply masters 20 detects a state of the area battery 22 (for example, a charge rate) (Step T3). Subsequently, each of the area power supply masters 20 controls the power supply (Step T4). For example, each of the area power supply masters 20 supplies electric power of the main battery 12 supplied from the vehicle power supply master 10 through the main line unit 1a of the one system and the branch line units 1b or electric power of the area battery 22 to the load units 2 based on the state of the main battery 12 and the area battery 22. The processing on power supply control will be described in detail later.

Subsequently, each of the area power supply masters 20 transmits a signal to the vehicle power supply master 10 through the main line unit 1a of the one system and the branch line units 1b (Step T5). For example, each of the area power supply masters 20 transmits information related to electric power supplied at Step T4 described above to the vehicle power supply master 10 through the main line unit 1a of the one system and the branch line units 1b. Specifically, each of the area power supply masters 20 transmits, to the vehicle power supply master 10, the information that electric power of the main battery 12 is supplied to the load units 2, or electric power of the area battery 22 is supplied to the load units 2. Subsequently, each of the area power supply masters 20 transmits a signal to the other area power supply masters 20 through the main line unit 1a of the one system and the branch line units 1b (Step T6), and the process ends. For example, each of the area power supply masters 20 transmits information related to electric power supplied at Step T4 described above to the other area power supply masters 20 through the main line unit 1a of the one system and the branch line units 1b. In this manner, as the processing on power supply control, each of the area power supply masters 20 supplies electric power of the main battery 12 that is supplied from the vehicle power supply master 10 or electric power of the area battery 22 to the load units 2 based on the state and the like of the main battery 12 and the area battery 22.

Figure 8:
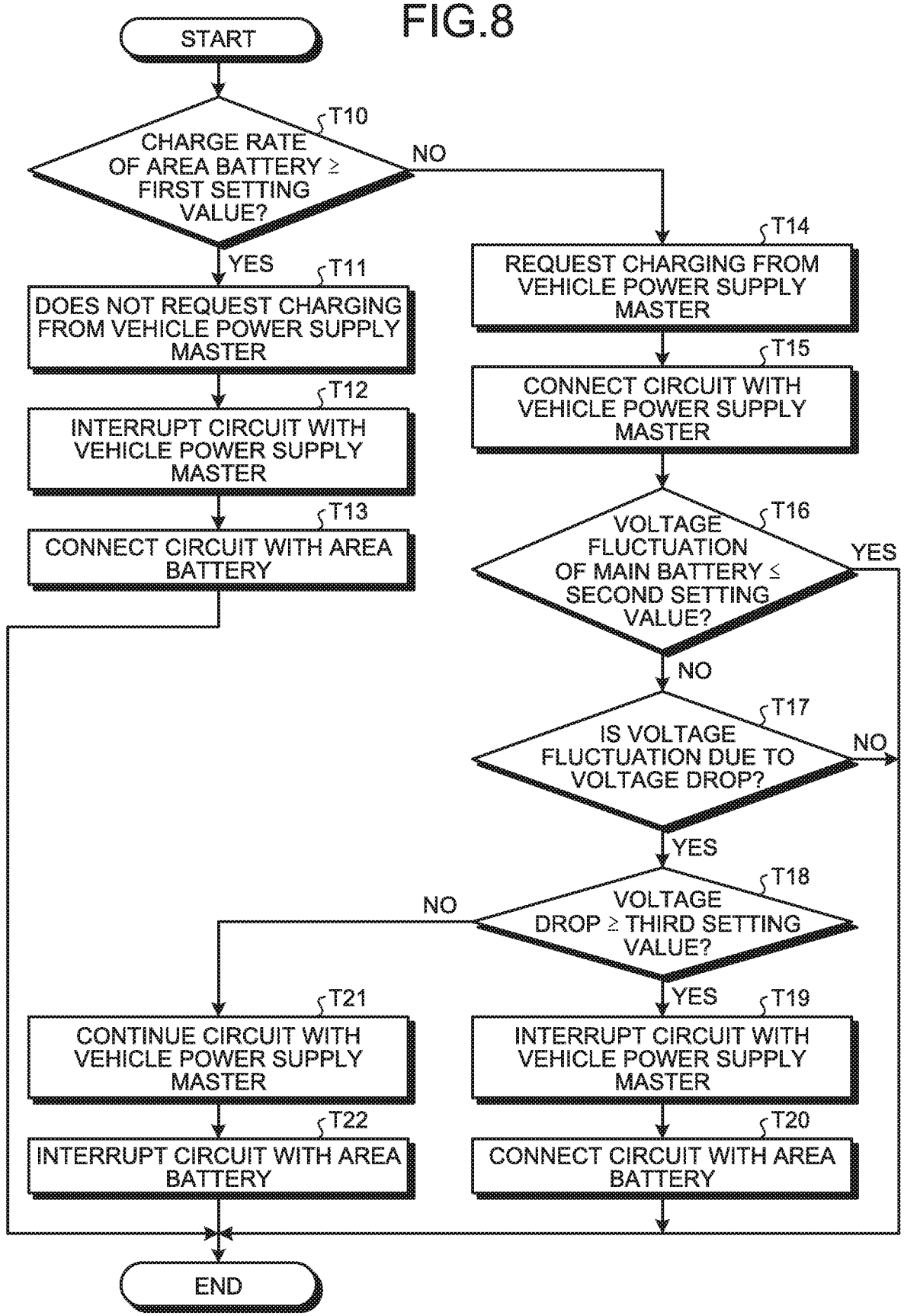
FIG. 8 is a flowchart illustrating the second operation example of the vehicle power supply control device in accordance with the first embodiment.

The following describes the processing on power supply control at Step T4 described above in detail. Each of the area power supply masters 20 determines whether a charge rate of the corresponding area battery 22 is equal to or larger than a predetermined first setting value as illustrated in FIG. 8 (Step T10). When the charge rate of the area battery 22 is equal to or larger than the predetermined first setting value (Yes in Step T10), each of the area power supply masters 20 does not request charging from the vehicle power supply master 10 (Step T11). Subsequently, each of the area power supply masters 20 interrupts a circuit with the vehicle power supply master 10 (Step T12). For example, each of the area power supply masters 20 turns off the switch of the interruption circuit 27a of the power supply controller 27. Subsequently, each of the area power supply masters 20 connects a circuit with the area battery 22 (Step T13). For example, each of the area power supply masters 20 turns on the relay contact 26a of the power supply switching unit 26. In this manner, when a charge rate of the area battery 22 is equal to or larger than the first setting value, each of the area power supply masters 20 supplies electric power of the area battery 22 to the load units 2.

By contrast, when a charge rate of the area battery 22 is smaller than the predetermined first setting value (No in Step T10), each of the area power supply masters 20 requests charging from the vehicle power supply master 10 (Step T14). For example, each of the area power supply masters 20 outputs a signal indicating a charging request to the vehicle power supply master 10 through the main line unit 1a of the one system and the branch line units 1b. Subsequently, each of the area power supply masters 20 connects a circuit with the vehicle power supply master 10 (Step T15). For example, each of the area power supply masters 20 turns on the switch of the interruption circuit 27a of the power supply controller 27.

Subsequently, each of the area power supply masters 20 determines whether voltage fluctuation of the main battery 12 is equal to or smaller than a predetermined second setting value (Step T16). When voltage fluctuation of the main battery 12 is equal to or smaller than the second setting value (Yes in Step T16), each of the area power supply masters 20 charges the area battery 22 with electric power of the main battery 12 from the vehicle power supply master 10, and the process ends. When voltage fluctuation of the main battery 12 exceeds the second setting value (No in Step T16), each of the area power supply masters 20 determines whether the voltage fluctuation of the main battery 12 is due to voltage drop (Step T17). When voltage fluctuation of the main battery 12 is due to voltage drop (Yes in Step T17), each of the area power supply masters 20 determines whether a voltage of the voltage fluctuation is equal to or larger than a predetermined third setting value (Step T18). When a voltage of voltage fluctuation is equal to or larger than the third setting value (Yes in Step T18), each of the area power supply masters 20 interrupts a circuit with the vehicle power supply master 10 (Step T19) and connects a circuit with the area battery 22 (Step T20), and the process ends. In this manner, when the vehicle power supply master 10 cannot supply electric power to each of the area power supply masters 20, each of the area power supply masters 20 supplies electric power of the area battery 22 to load units 2 even though a charge rate of the area battery 22 is low. When a charge rate of the area battery 22 is smaller than a fourth setting value smaller than the above-mentioned first setting value (for example, when the charge rate is substantially 0), each of the area power supply masters 20 does not supply electric power of the area battery 22 to the load units 2.

By contrast, when a voltage of voltage fluctuation is smaller than the third setting value at Step T18 described above (No in Step T18), each of the area power supply masters 20 continues circuit connection with the vehicle power supply master 10 (Step T21) and interrupts a circuit with the area battery 22 (Step T22), and the process ends. When voltage fluctuation of the main battery 12 is due to voltage rise at Step T17 described above (No in Step T17), each of the area power supply masters 20 charges the area battery 22 with electric power of the main battery 12 from the vehicle power supply master 10, and the process ends.

As described above, the vehicle power supply control device 1 according to the first embodiment as the second operation example includes the main line unit 1a of the one system that is provided to a vehicle, each of the branch line units 1b that branch from the main line unit 1a of the one system, the vehicle power supply master 10 that is connected to the main line unit 1a of the one system and includes the main battery 12 that charges/discharges electric power, and the area power supply masters 20 that are connected to the main line unit 1a of the one system through each of the branch line units 1b and are connected to the load units 2 consuming electric power and include the area battery 22 that charges/discharges electric power. In the vehicle power supply control device 1, the vehicle power supply master 10 supplies electric power of the main battery 12 to the area power supply masters 20 through the main line unit 1a of the one system and the branch line units 1b, and the area power supply masters 20 supply electric power that is supplied from the vehicle power supply master 10 or electric power with which the corresponding area battery 22 is charged to the load units 2.

In this manner, when electric power is supplied from the vehicle power supply master 10 through the main line unit 1a of the one system and the branch line units 1b, the vehicle power supply control device 1 can supply the electric power from the vehicle power supply master 10 to the load units 2. When electric power is not supplied from the vehicle power supply master 10 through the main line unit 1a of the one system and the branch line units 1b, the vehicle power supply control device 1 can supply electric power with which the area battery 22 is charged to the load units 2. Thus, the vehicle power supply control device 1 can stably supply electric power to each of the load units 2 of a vehicle. The vehicle power supply control device 1 can easily cause, for example, larger current to flow through the main line unit 1a of the one system so as to stably supply electric power to the load units 2. The vehicle power supply control device 1 can improve wiring property by the main line unit 1a of the one system and the branch line units 1b.

In the vehicle power supply control device 1, when the vehicle power supply master 10 cannot supply electric power to each of the area power supply masters 20 through the main line unit 1a of the one system and the branch line units 1b, the area power supply masters 20 supply electric power of the area battery 22 to the load units 2. In this manner, the vehicle power supply control device 1 can supply electric power of the area battery 22 to the load units 2, for example, even when a charge rate of the main battery 12 is low and electric power cannot be supplied to each of the area power supply masters 20, thereby stably supplying electric power to the load units 2.

In the vehicle power supply control device 1, when a charge rate of the area battery 22 is equal to or larger than the predetermined first setting value, the area power supply masters 20 supply electric power of the area battery 22 to the load units 2. When a charge rate of the area battery 22 is smaller than the fourth setting value, the area power supply masters 20 do not supply electric power of the area battery 22 to the load units 2. In this manner, the vehicle power supply control device 1 can supply electric power of the area battery 22 to the load units 2 depending on a charge rate of the area battery 22.

Second Embodiment

Figure 9:
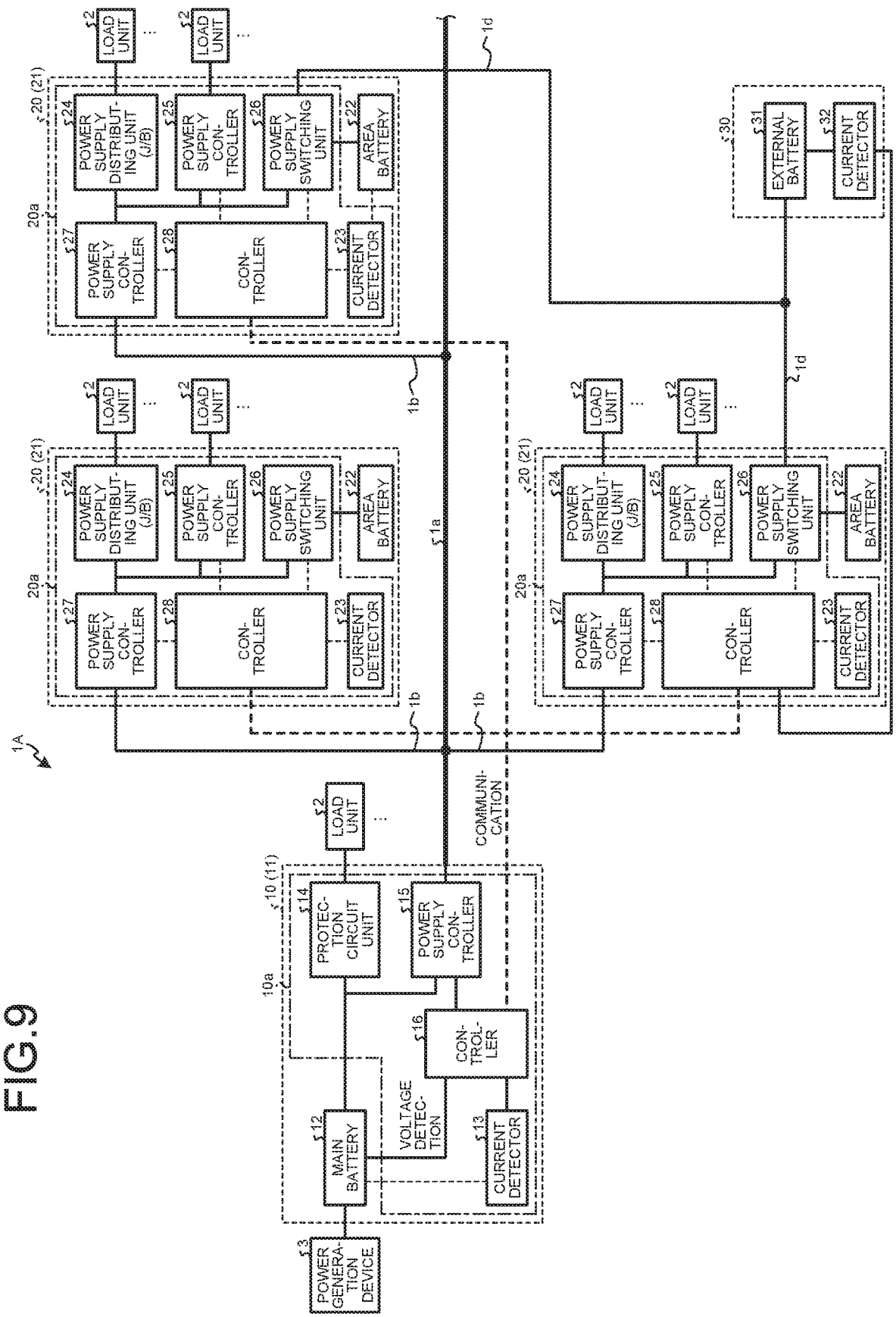
FIG. 9 is a block diagram illustrating a configuration example of a vehicle power supply control device in accordance with a second embodiment.

The following describes a vehicle power supply control device 1A according to a second embodiment. The vehicle power supply control device 1A differs from the vehicle power supply control device 1 according to the first embodiment in that the vehicle power supply control device 1A includes an external electric power supply unit 30 illustrated in FIG. 9. In the same configurations of the vehicle power supply control device 1A according to the second embodiment as those of the vehicle power supply control device 1 according to the first embodiment, like numerals are assigned and the explanation is omitted.

The external electric power supply unit 30 supplies electric power to each of the area power supply masters 20. The external electric power supply unit 30 is provided outside each of the area power supply masters 20, and is connected to the power supply switching unit 26 of each of the area power supply masters 20 through a connection line 1d. The external electric power supply unit 30 includes an external battery 31 and a current detector 32. The external battery 31 is an external power storage device, and charges and discharges electric power. The external battery 31 is different from the main battery 12, and is connected to each of the area power supply masters 20. The external battery 31 includes various kinds of storage batteries such as a lead battery and a nickel-hydrogen battery, and a lithium-ion battery. The external electric power supply unit 30 supplies electric power from the external battery 31 to each of the area power supply masters 20 through the connection line 1d. The current detector 32 is connected to the external battery 31 and detects current of the external battery 31. The current detector 32 includes, for example, a shunt resistor, and detects current of charging/discharging of the external battery 31. Specifically, the current detector 32 detects current from a voltage that is proportional to current generated by resistance of the shunt resistor. The current detector 32 is connected to one of the area power supply masters 20, and outputs a detection result to the area power supply master 20. The area power supply master 20 charges and discharges the external battery 31 based on the detection result output from the current detector 32. For example, when a charge rate of the external battery 31 is equal to or larger than a predetermined setting value, the area power supply master 20 controls the external battery 31 to be discharged. When a charge rate of the external battery 31 is smaller than the predetermined setting value, the area power supply master 20 controls the external battery 31 to be charged.

The relay contact 26a of the power supply switching unit 26 is turned on by each of the area power supply masters 20, and the external electric power supply unit 30 supplies electric power of the external battery 31 to each of the area power supply masters 20. In this manner, each of the area power supply masters 20 can supply electric power to the load units 2 more stably. The relay contact 26a of the power supply switching unit 26 is turned off by each of the area power supply masters 20, and the external electric power supply unit 30 stops supplying the electric power to each of the area power supply masters 20. The external electric power supply unit 30 may include a power generation device instead of the battery. In this case, the relay contact 26a of the power supply switching unit 26 is turned on by each of the area power supply masters 20, and the external electric power supply unit 30 supplies electric power generated by the power generation device to each of the area power supply masters 20. Thus, the vehicle power supply control device 1A can supply electric power to each of the load units 2 more stably.

Modification

The following describes a modification of the first and second embodiments. In the vehicle power supply control devices 1 and 1A, when the vehicle power supply master 10 can supply electric power to each of the area power supply masters 20 through the main line unit 1a of the one system and the branch line units 1b and a charge rate of the area battery 22 is equal to or larger than a setting value, each of the area power supply masters 20 may preferentially supply electric power of the area battery 22 to the load units 2. For example, in the vehicle power supply control devices 1 and 1A, when a charge rate of the main battery 12 is equal to or larger than a predetermined setting value and a charge rate of the area battery 22 is equal to or larger than the first setting value, each of the area power supply masters 20 may preferentially supply electric power of the area battery 22 to the load units 2. In this manner, the vehicle power supply control devices 1 and 1A can prevent the main battery 12 of the vehicle power supply master 10 from being intensively used. The vehicle power supply control devices 1 and 1A can effectively use the area battery 22.

In the vehicle power supply control devices 1 and 1A, the vehicle power supply master 10 may supply, depending on a situation, electric power of the area battery 22 of the one area power supply master 20 to the load units 2 connected to the other area power supply master 20 through the branch line unit 1b, the main line unit 1a of the one system, and the branch line unit 1b. For example, when electric power of the area battery 22 of the other area power supply master 20 cannot be supplied to the load units 2 connected to the other area power supply master 20, the vehicle power supply master 10 may supply electric power of the area battery 22 of the one area power supply master 20 to the load units 2 connected to the other area power supply master 20. Specifically, when a charge rate of the area battery 22 of the one area power supply master 20 is equal to or larger than the first setting value and a charge rate of the area battery 22 of the other area power supply master 20 is smaller than the first setting value, the vehicle power supply master 10 supplies electric power from the one area power supply master 20 to each of the load units 2 connected to the other area power supply master 20. In this manner, the vehicle power supply control devices 1 and 1A can stably supply electric power to each of the load units 2 because electric power can be supplied between the area power supply masters 20.

When receiving a request of charging from the one area power supply master 20, the vehicle power supply master 10 may charge the area battery 22 of the one area power supply master 20 with electric power supplied from the main battery 12 of the vehicle power supply master 10 or electric power with which the area battery 22 of the other area power supply master 20 is charged.

The vehicle power supply master 10 may charge the main battery 12 with electric power supplied from each of the area power supply masters 20. For example, when a charge rate of the main battery 12 decreases, the vehicle power supply master 10 checks a state (for example, a charge rate) of the area battery 22 of each of the area power supply masters 20. The vehicle power supply master 10 then charges the main battery 12 with electric power supplied from the area power supply master 20 that is capable of supplying electric power.

A vehicle power supply control device according to each of the present embodiments can stably supply electric power to a load unit of a vehicle because a master power supply controller supplies electric power of a main power storage device to an area power supply controller through a main line unit of one system, and the area power supply controller supplies electric power supplied from the master power supply controller or electric power with which a sub power storage device is charged to the load unit.

Although the invention has been described with respect to the specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply control device comprising:
   a main line unit of one system that is provided on a vehicle;
   a branch line unit that is branched off from the main line unit of the one system;
   a master power supply controller that is connected to the main line unit of the one system and includes a main power storage device that charges and discharges electric power; and
   an area power supply controller that is connected to the main line unit of the one system through the branch line unit and is connected to a load unit that consumes electric power, and includes a sub power storage device that charges and discharges electric power, wherein
   the master power supply controller supplies electric power of the main power storage device to the area power supply controller through the main line unit of the one system and the branch line unit, and
   the area power supply controller supplies, to the load unit, electric power that is supplied from the master power supply controller or electric power that is charged in the sub power storage device.

2. The vehicle power supply control device according to claim 1, wherein
   the area power supply controller supplies electric power of the sub power storage device to the load unit when the master power supply controller does not supply electric power to the area power supply controller through the main line unit of the one system and the branch line unit.

3. The vehicle power supply control device according to claim 1, wherein
the area power supply controller supplies electric power of the sub power storage device to the load unit when a charge rate of the sub power storage device is equal to or larger than a predetermined setting value, and
the area power supply controller does not supply electric power of the sub power storage device to the load unit when a charge rate of the sub power storage device is smaller than the setting value.

4. The vehicle power supply control device according to claim 2, wherein
the area power supply controller supplies electric power of the sub power storage device to the load unit when a charge rate of the sub power storage device is equal to or larger than a predetermined setting value, and
the area power supply controller does not supply electric power of the sub power storage device to the load unit when a charge rate of the sub power storage device is smaller than the setting value.

5. The vehicle power supply control device according to claim 1, wherein
the area power supply controller preferentially supplies electric power of the sub power storage device to the load unit when the master power supply controller is able to supply electric power to the area power supply controller through the main line unit of the one system and the branch line unit and a charge rate of the sub power storage device is equal to or larger than the setting value.

6. The vehicle power supply control device according to claim 2, wherein
the area power supply controller preferentially supplies electric power of the sub power storage device to the load unit when the master power supply controller is able to supply electric power to the area power supply controller through the main line unit of the one system and the branch line unit and a charge rate of the sub power storage device is equal to or larger than the setting value.

7. The vehicle power supply control device according to claim 3, wherein
the area power supply controller preferentially supplies electric power of the sub power storage device to the load unit when the master power supply controller is able to supply electric power to the area power supply controller through the main line unit of the one system and the branch line unit and a charge rate of the sub power storage device is equal to or larger than the setting value.

8. The vehicle power supply control device according to claim 1, wherein
a plurality of the area power supply controllers are provided, and
the master power supply controller supplies, depending on a situation, electric power of the sub power storage device of one of the area power supply controllers to the load unit connected to another of the area power supply controllers through the main line unit of the one system and the branch line unit.

9. The vehicle power supply control device according to claim 2, wherein
a plurality of the area power supply controllers are provided, and
the master power supply controller supplies, depending on a situation, electric power of the sub power storage device of one of the area power supply controllers to the load unit connected to another of the area power supply controllers through the main line unit of the one system and the branch line unit.

10. The vehicle power supply control device according to claim 3, wherein
a plurality of the area power supply controllers are provided, and
the master power supply controller supplies, depending on a situation, electric power of the sub power storage device of one of the area power supply controllers to the load unit connected to another of the area power supply controllers through the main line unit of the one system and the branch line unit.

11. The vehicle power supply control device according to claim 5, wherein
a plurality of the area power supply controllers are provided, and
the master power supply controller supplies, depending on a situation, electric power of the sub power storage device of one of the area power supply controllers to the load unit connected to another of the area power supply controllers through the main line unit of the one system and the branch line unit.

12. The vehicle power supply control device according to claim 1, further comprising:
an external electric power supply unit that is provided outside the area power supply controller and is different from the main power storage device, wherein
the external electric power supply unit is connected to the area power supply controller and supplies electric power to the area power supply controller.

13. The vehicle power supply control device according to claim 2, further comprising:
an external electric power supply unit that is provided outside the area power supply controller and is different from the main power storage device, wherein the external electric power supply unit is connected to the area power supply controller and supplies electric power to the area power supply controller.

14. The vehicle power supply control device according to claim 3, further comprising:
an external electric power supply unit that is provided outside the area power supply controller and is different from the main power storage device, wherein the external electric power supply unit is connected to the area power supply controller and supplies electric power to the area power supply controller.

15. The vehicle power supply control device according to claim 5, further comprising:
an external electric power supply unit that is provided outside the area power supply controller and is different from the main power storage device, wherein the external electric power supply unit is connected to the area power supply controller and supplies electric power to the area power supply controller.

16. The vehicle power supply control device according to claim 8, further comprising:
an external electric power supply unit that is provided outside the area power supply controller and is different from the main power storage device, wherein the external electric power supply unit is connected to the area power supply controller and supplies electric power to the area power supply controller.

* * * * *